Figure 1:
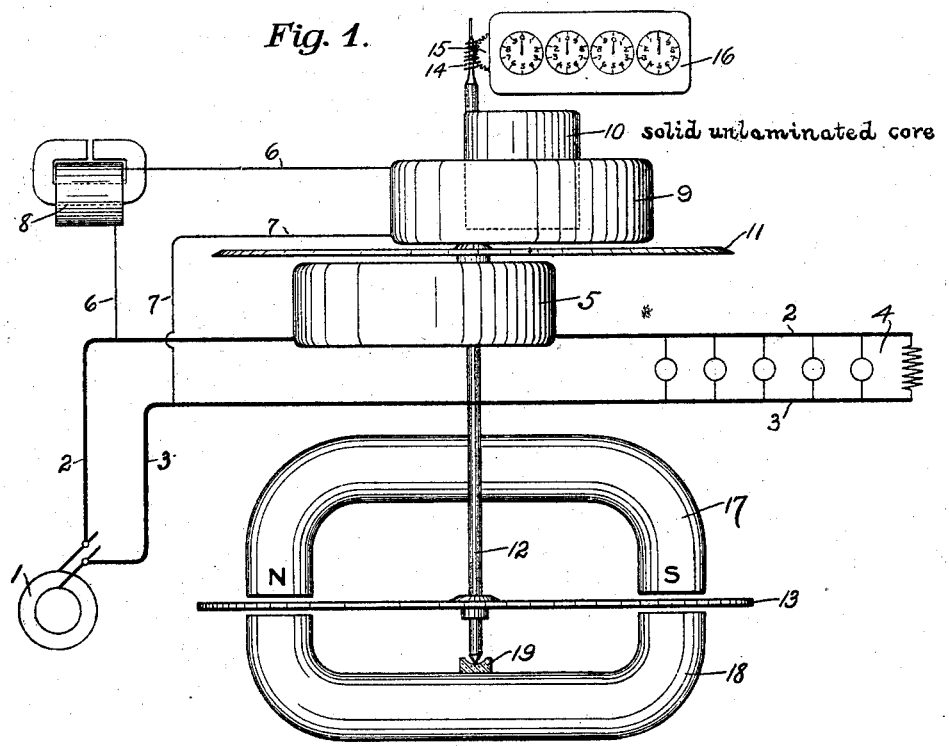

No. 698,640. Patented Apr. 29, 1902.
T. DUNCAN.
ELECTRIC METER.
(Application filed June 29, 1898.)

(No Model.) 2 Sheets—Sheet 1.

Witnesses
Samuel R. Bachtel
Andrew J. Robinson

Thomas Duncan Inventor.
By his Attorneys Chapin & Denny

THE NORRIS PETERS CO., PHOTO-LITHO., WASHINGTON, D. C.

No. 698,640. Patented Apr. 29, 1902.
T. DUNCAN.
ELECTRIC METER.
(Application filed June 29, 1898.)
(No Model.) 2 Sheets—Sheet 2.
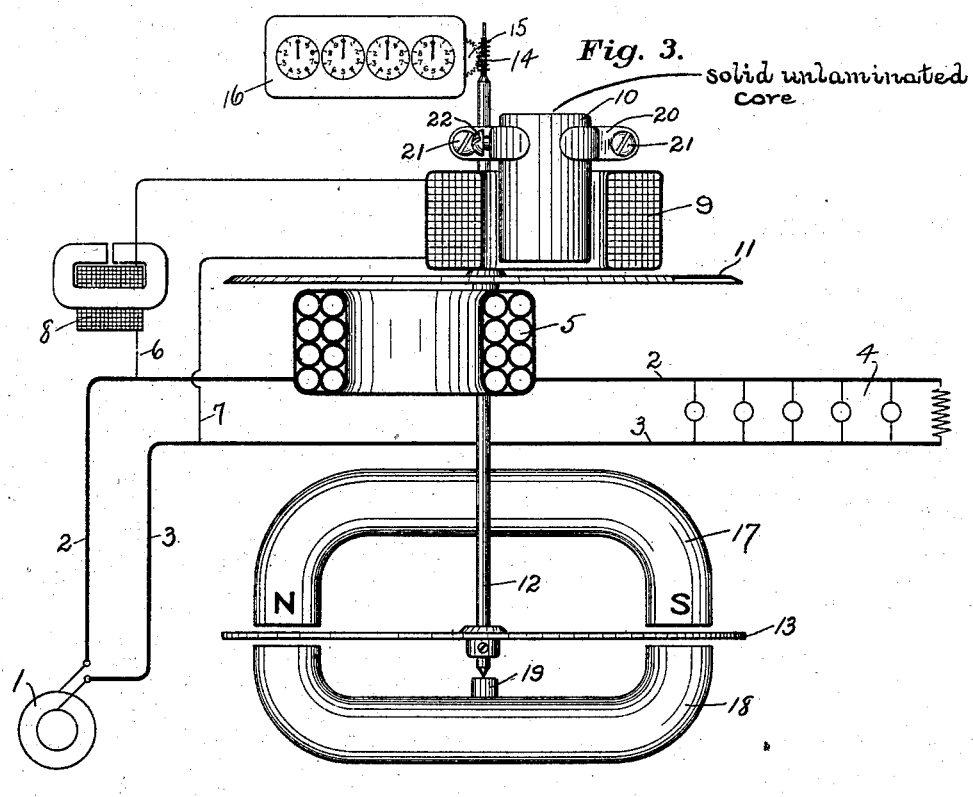
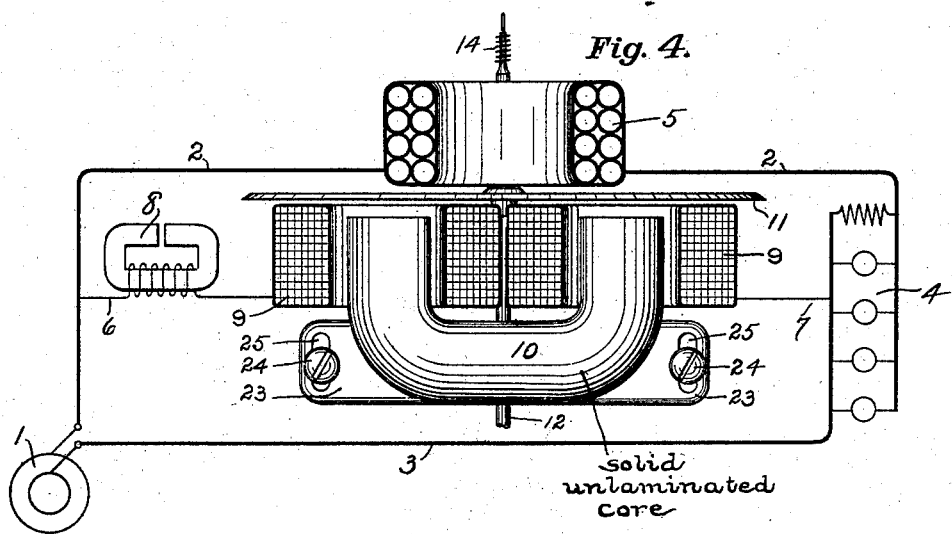

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,640, dated April 29, 1902.

Application filed June 29, 1898. Serial No. 684,716. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My present invention relates to improvements in induction motor-meters.

The objects of my invention are to provide a meter of simple and economical construction adapted to measure with accuracy the energy consumed in inductive translating devices, such as arc-lamps and motors, to provide in an induction motor-meter an improved method of and means for securing a magnetic field in quadrature with the line-pressure for the accurate measurement of inductive loads, and to provide a meter adapted for use upon more than one rate of alternations and also adapted to record accurately on any and all of the various frequencies met with in alternating-current practice.

It is well known that the customary manner of measuring inductive loads and obtaining a lag of ninety degrees in the shunt or volt magnetism behind the electromotive force which it represents in alternating-current motor-meters now in use is by the employment of the resultant magnetic effect of a plurality of shunt-coils of differing phase, which when combined with the magnetism of a suitable series coil representing the amperes produces rotation of the revoluble metallic armature in a well-understood manner. I secure this desired result in my present invention without the necessity of employing any closed secondaries in conjunction with the shunt or volt coil by utilizing the hysteresis and reluctance of a solid magnetic core in cooperative relation with the shunt or volt coil, as will be hereinafter fully described.

My present improvement is also adapted to overcome an objectionable defect found in the meters at present in use—viz., their inability to adapt themselves to a wide range of frequencies—as, for example, from sixty to one hundred and forty periods—without requiring a special adjustment for a given periodicity.

To make the speed of the armature in an induction motor-meter constant with a constant load on different frequencies, some means must be provided by which the changes in periodicity and rate of cutting of the lines of force through the armature must be compensated for by an inverse change in the density of flux before the armature will respond alike to a given wattage for differing frequencies—that is, if a meter is adjusted for, say, one hundred and forty periods, then by using the same meter on sixty periods the reduction in the alternations causes a reduction in the rate of cutting of the lines of force, which would as a consequence reduce the inductive effect upon the armature, thereby causing it to run slower than on the one hundred and forty periods with the same number of watts; but by increasing the strength of the magnetic field by an amount that will balance and compensate for the reduction in the rate of cutting due to a reduced frequency the speed of the armature will remain constant for a constant load irrespective of the change in the rate of alternations. Again, if the meter should be calibrated for sixty cycles and it is desired to utilize it on one hundred and forty periods also the shunt or pressure field-coil must be so organized that when it is subjected to the higher frequency its magnetic field must be reduced automatically in density by an amount that will balance the tendency to increase torque due to the increased rate of alternations and subsequent increased rate of cutting. The demand for such a meter or one that can adapt itself to any of the present periodicities met with in modern central-station work is rapidly increasing on account of the many older stations being equipped with high-frequency apparatus, and the present additions being low-frequency apparatus, in order that their business may successfully include the operation of motors. For this reason a number of central stations are obliged to carry two different classes of induction motor-meters, one class adjusted for low frequency and the other for high frequency, which causes much confusion and annoyance in keeping them separated. Another practice which exists to-day is the feeding of low-frequency currents during the day for power purposes principally, and during the night, when motors are out of service, the high-frequency dynamos are switched upon the same circuits for lighting purposes, thereby introducing a condition that cannot be met by any induction-meter upon the market at the present time. It must also be borne in mind that in addition to overcoming the foregoing obstacles the meter must be able to also measure accurately lagging currents with the various frequencies as well as non-lagging or non-inductive currents. To overcome the foregoing objections by producing a meter that can be used on any rate of alternation and measure both inductive and non-inductive loads is the principal object of the present invention.

I have experimentally discovered that if a solid tool-steel core be inserted into the pressure or volt field-coil of an induction-meter that a uniform speed of the meter-armature can be maintained with a uniform load in watts irrespective of the rate of alternations—i.e., either seven thousand two hundred or sixteen thousand eight hundred, these being the two extremes in use at present. In connection with the foregoing I have also demonstrated experimentally that by a proper adjustment of the solid tool-steel core and the convolutions comprising the present or volt field-coil, the magnetism produced by the current in said coil can be caused to lag behind said current and maintained at a given angle of lag whether the current be sixty or one hundred and forty periods, thereby making it possible for my improved meter to measure inductive loads accurately on both sixty and one-hundred-and-forty period circuits.

The manner in which the foregoing conditions are maintained is upon the assumption that when the solid-steel core is being magnetized by a high-frequency current its magnetizing effect upon the armature is represented by a given strength or density at a given rate of cutting, and when subjected to a low frequency the rate of cutting is decreased; but the strength or density of its magnetism is increased on account of the reluctance and hysteresis being less with the lower frequency and by an amount that compensates for the reduced alternations and rate of cutting. In this way the reluctance and hysteresis of the solid steel core adjusts and governs the strength or density of its magnetism for the different periodicities, enabling it thereby to maintain a constant value for a constant electromotive force irrespective of the rate of alternations. The maintenance of the magnetic field in quadrature with the line-pressure through the instrumentality of the solid steel core with different frequencies and enabling the instrument to accurately measure inductive loads on said different frequencies is also due, no doubt, to the varying control by hysteresis and reluctance of the magnetism through said core. This latter quality may, for example, be ascribed to the solid steel core by assuming that with a high-frequency current the magnetism has a given phase relation with said current—say ten degrees behind it—and which we will assume is also ninety degrees behind the line-pressure. Then by passing a low-frequency current through the pressure-coil that magnetizes the said solid steel core the reluctance and hysteresis of said core are reduced, thereby permitting a greater amount of effective magnetism through it, and by passing more magnetism through it the hysteretic eddy currents are increased, thereby maintaining the phase angle of the magnetism of the core at ninety degrees. The said increase in eddy currents compensates for the decrease in the self-induction of the pressure-circuit which is traversed by the current magnetizing said solid steel core by increasing the magnitude or value of the eddy currents to balance the decrease in self-induction of the pressure-circuit, so that on any frequency the effective magnetism through the solid core will be ninety degrees or the resultant of the hysteretic eddies in said core and the magnetism imparted to it by the current traversing the volt field-coil surrounding it.

I am aware that a solid magnetizable core has heretofore been employed for the purpose of retarding the phase of the magnetism passing through it; but in no instance of which I am aware has it been employed to further augment the magnetism produced by a previously-lagged current, as set forth and illustrated by my present invention, and which involves the lagging of a magnetic field to ninety degrees behind the line-pressure which it represents. Neither am I aware of any application in which a solid steel core is employed in the shunt or pressure field-coil of an induction motor-meter to accomplish the other results hereinbefore set forth—viz., to maintain the magnetism through it at a definite lag-angle irrespective of the periodicity of the system, and making it possible thereby to measure inductive loads on a circuit supplied by currents of different periodicities.

My invention comprises as its principal operative parts or elements a series field-coil, a shunt field-coil, an impedance-coil, a solid magnetic core, a revoluble armature in inductive relation to said coils, a registering mechanism, and a damping or retarding device.

Figure 2:
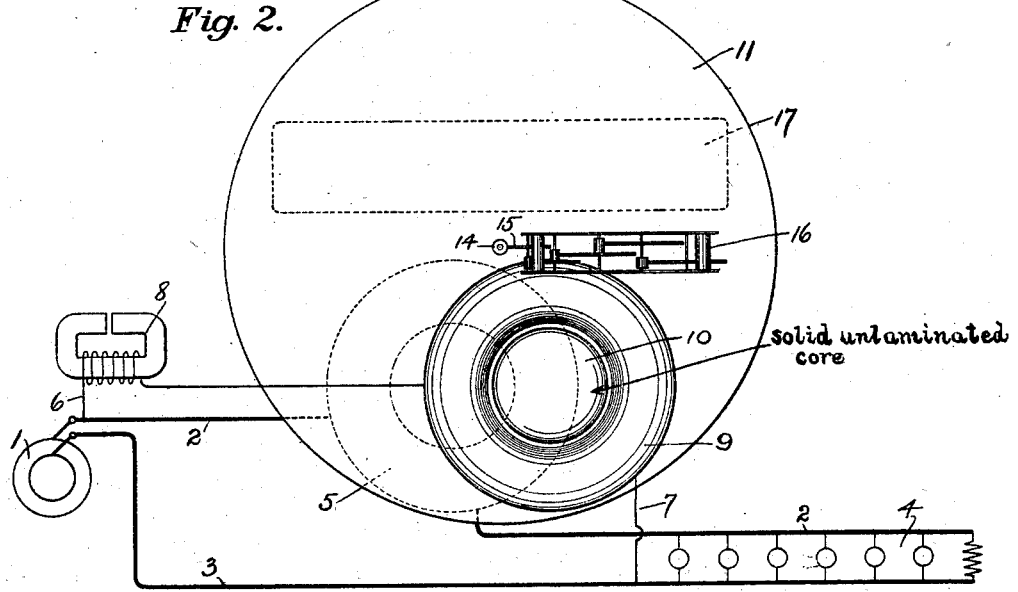

In the accompanying drawings, illustrative of my invention, in which similar reference-numerals indicate like parts throughout, Figure 1 is a front elevation showing the relative arrangement of the operative parts of my improvement. Fig. 2 is a plan view of Fig.

1. Fig. 3 is a front elevation showing the energizing-coils in vertical section. Fig. 4 is also a front elevation showing a modified arrangement of the shunt-coils and lagging core, the energizing-coils being shown in section.

Upon a vertical step 19 is erected the upright revoluble armature-spindle 12, having proper bearings at its extremities and provided upon its upper end with a worm 14, adapted to mesh with and actuate a gear-wheel 15 of a proper registering-train 16. At a suitable point on said spindle is rigidly fixed a metallic disk-armature 11, having the energizing-coil arranged upon opposite sides thereof, the series or ampere-coil 5 upon one side, and the shunt or volt coils 9 upon the other side. Near the lower end of said spindle is rigidly fixed a metallic disk 13, which is arranged in inductive relation to the retarding-magnet 17, Figs. 1 and 3. A solid magnetic lagging core 10 is adjustably mounted within the shunt-coil 9, Figs. 1, 2, and 3, and in concentric relation therewith and may be secured in position by a proper clamp 20, fixed to a suitable support with the screws 21 and is adapted for a longitudinal adjustment within said shunt-coil by means of the set-screw 22 in a well-understood manner. In Fig. 4 is shown a modified form and arrangement of the said lagging core 10, being U-shaped, as shown, and adapted to have its ends adjustably arranged within a pair of shunt-coils 9, as shown. This core 10 is rigidly connected to the horizontal bar or plate 23, having its opposite ends provided with a transverse slot 25. In these slots are arranged the screws 24, having their inner end inserted into any proper support, as the back of the meter, and adapted by means of said slots to afford a limited vertical adjustment of said plate and core for the purpose hereinafter described. The manner of mounting and adjusting the said lagging core is obviously a mere mechanical detail and may readily be varied at pleasure.

While I have shown the series field as comprising a single coil, a plurality of series coils may be employed, if desired.

The operation of my improvement thus described may be briefly stated as follows: Referring now particularly to Fig. 3, the main current from the generator supplying the lamps or translating devices 4, by means of the circuit-leads 2 and 3, traverses the series or ampere coils 5, and thereby sets up or establishes a magnetic field whose intensity is proportional to the current strength. To produce rotation of the said closed revoluble disk armature, the following conditions are requisite. The axis of the shunt-coil 9 must be eccentric to the axis of the series coil 5 and parallel therewith. The current in the said shunt-coil 9, which represents the electromotive force of the service-mains, must lag behind the said electromotive force, and since my improved meter is designed to measure the energy on circuits having lagging currents the magnetism through the said shunt-coil 9 must lag ninety degrees behind the pressure of the system and must also be in quadrature with the magnetism of the series coil 5 when the translating devices are non-inductive. To secure a quadrature of the magnetism of the said shunt-coil with the line-pressure, which is the principal object of my invention, I introduce an impedance-coil 8 in series with the said shunt-coil 9, thereby producing a lag of the current through this circuit necessarily somewhat less than ninety degrees. To secure the required lag of said current or ninety degrees, I arrange the said solid magnetic core 10 within the said shunt-coil, and by thus utilizing the hysteretic and reluctive qualities of said core I secure the desired result. The magnetism of the said core 10 can readily be adjusted to exact quadrature in either one of two ways—by varying the current through the said shunt-coil 9 and the impedance-coil 8, which are connected to the service-mains 2 and 3 by means of the wires 6 and 7, or by a longitudinal adjustment of the said core within the shunt-coil by the described means or other proper manner. Obviously if the inductance of the said impedance-coil causes a lag of the current through the coil 9 of, say, eighty degrees the presence of the said lagging core 10 prevents the magnetism of said coil from being in phase with its current, and by means of the reluctance and hysteresis of said core the progress of said magnetism is further retarded—say ten degrees—behind the current in said shunt-coil, thereby securing the desired lag of said magnetism ninety degrees behind the line electromotive force. By a combination or coöperation of this lagging shunt-field magnetism with the magnetism of the series coil a shifting magnetic field is produced adapted to actuate the said revoluble armature with a torque proportional to the real watts. The retarding device, consisting of a magnet 17, a metallic disk 13, and the metal keeper 18, is adapted to make the speed of said armature proportional to the energy consumed in a well-understood manner.

I do not wish to be understood as limiting myself to the use of a solid tool-steel core, as I have also obtained good results with other solid magnetic mediums, such as other grades of steel, wrought and cast iron, and cast-steel. Neither do I confine myself to the theories herein expressed respecting the magnetic action of said cores in maintaining the magnetism through them at a constant-phase angle irrespective of the rate of change of said magnetism.

What I desire to secure by Letters Patent is—

1. In a multifrequency induction motor-meter, the combination with energizing-windings receiving current from the generator, of an armature in inductive relation therewith, and an unlaminated core in coöperative relation with one of the said energizing-windings for varying the magnetism due to the said coil to compensate for variation of frequency, substantially as described.

2. In an induction-meter, the combination with a revoluble armature, of a current-winding in inductive relation therewith, a pressure-winding also in inductive relation to said armature, and an unlaminated magnetizable core for said pressure-winding for maintaining the magnetism due to the pressure-winding in quadrature with the pressure, substantially as described.

3. In a multifrequency induction motor-meter, the combination with current and pressure energizing windings, of an armature in inductive relation therewith, and an unlaminated magnetizable core for said pressure-winding for varying the magnetism due to the said coil to compensate for variation of frequency, substantially as described.

4. In a multifrequency induction motor-meter, the combination with current and pressure energizing windings, of an armature in the form of a revoluble disk in inductive relation therewith, and an unlaminated magnetizable core for said pressure-winding for varying the magnetism due to the said coil to compensate for variation of frequency, substantially as described.

5. In a multifrequency induction motor-meter, the combination with current and pressure energizing windings, of an armature in inductive relation therewith, and an unlaminated magnetizable core for said pressure-winding for varying the magnetism due to the said coil to compensate for variation of frequency, the pressure-winding and said unlaminated core being located upon the same side of the armature, substantially as described.

6. In a multifrequency induction motor-meter, the combination with current and pressure energizing windings, of an armature in inductive relation therewith, an unlaminated magnetizable core for said pressure-winding for varying the magnetism due to the said coil to compensate for variation of frequency, and an impedance-coil in circuit with the pressure-winding, substantially as described.

7. In an induction motor-meter, the combination with a revoluble armature, of a current-winding in inductive relation therewith, a pressure-winding also in inductive relation to said armature, an unlaminated magnetizable core for said pressure-winding for maintaining the magnetism due to the pressure-winding in quadrature with the pressure, and an impedance-coil in series with the pressure-winding, substantially as described.

8. In a multifrequency induction motor-meter, the combination with energizing-windings receiving current from the generator, of an armature in inductive relation therewith, and an unlaminated adjustable core in coöperative relation with one of the said energizing-windings for varying the magnetism due to the said coil to compensate for variation of frequency, substantially as described.

9. In an induction-meter, the combination with a movable armature, of a current-winding in inductive relation therewith, a pressure-winding also in inductive relation to the said armature, and an unlaminated magnetizable core for said pressure-winding for securing the requisite phase adjustment of the magnetism due to the pressure-winding, substantially as described.

10. In a multifrequency induction motor-meter, the combination with current and pressure energizing windings, of an armature in inductive relation therewith, and an adjustable unlaminated magnetizable core for said pressure-winding for varying the magnetism due to the said coil to compensate for variation of frequency, substantially as described.

11. In an induction-meter, the combination with a movable armature, of a current-winding, a pressure-winding in inductive relation to the said armature, and an unlaminated magnetizable core for said pressure-winding for securing the requisite phase adjustment of the magnetism due to the pressure-winding, substantially as described.

12. In an induction-motor, the combination with a movable armature of a winding, a pressure-winding in inductive relation to the said armature, and an unlaminated magnetizable core for said pressure-winding for securing the requisite phase adjustment of the magnetism due to the pressure-winding, substantially as described.

13. In a multifrequency induction motor-meter, the combination with current and pressure energizing windings, of an armature in inductive relation therewith, and an unlaminated magnetizable steel core for said pressure-winding for varying the magnetism due to the said coil to compensate for variation of frequency, substantially as described.

Signed by me at Fort Wayne, Allen county, State of Indiana, this 27th day of June, A. D. 1898.

THOMAS DUNCAN.

Witnesses:
EDWARD T. TIERNEY,
MAUDE MERILLAT.